INVENTORS
Hiromichi Matsushima
Tomoyuki Iio
BY
ATTORNEYS

United States Patent Office
3,738,901
Patented June 12, 1973

3,738,901
CLUTCH DISK AND METHOD OF MAKING
Hiromichi Matsushima, 123 Takabayashi-cho, and Tomoyuki Iio, 65-2 Nakazawa-cho, both of Hamamatsu-shi, Shizuoka-ken, Japan
Continuation-in-part of abandoned application Ser. No. 792,004, Jan. 17, 1969. This application Mar. 29, 1971, Ser. No. 128,709
Int. Cl. F16d 69/02, 69/04
U.S. Cl. 161—42
2 Claims

ABSTRACT OF THE DISCLOSURE

A clutch disk including a porous feltlike sheet of organic fibers, activated carbon made from coconut shells, and resol-type phenolic resin bonded to a core plate by comolding under heat and pressure, and a method of manufacture of the same.

This application is a continuation-in-part of our co-pending application Ser. No. 792,004 filed Jan. 17, 1969, for "Clutch Disk and Method of Making," now abandoned.

The invention relates to a clutch disk which is to be operated in a bath of circulating lubricant.

A purpose of the invention is to provide a clutch disk which will maintain a stable coefficient of friction with change in peripheral velocity, temperature and surface pressure.

A further purpose is to make a clutch disk of a porous feltlike sheet of organic fibers, and activated carbon particles made from coconut shells impregnated and bonded to a core plate by resol-type phenolic resin.

Further purposes appear in the specification and in the claims.

In the drawings we have chosen to illustrate one only of the numerous embodiments in which the invention may appear, selecting the form shown from the standpoints of convenience in illustration, satisfactory operation, and clear demonstration of the principles involved.

FIG. 4 shows the relationship between coefficient of friction $m\mu$ as ordinate and velocity V as abscissa.

FIG. 5 shows the relationship between coefficient of friction $m\mu$ as ordinate and temperature T as abscissa.

FIG. 6 shows the relationship between coefficient of friction $m\mu$ as ordinate and surface pressure P as abscissa.

Figure 1:
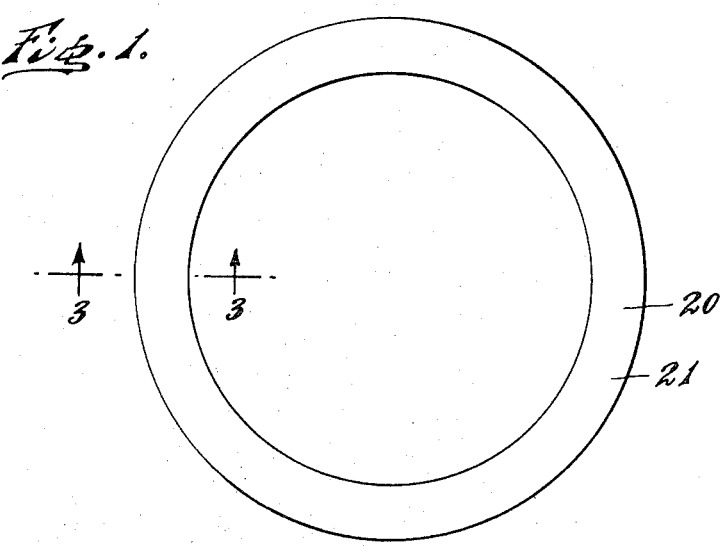
FIG. 1 is a plan view of the clutch disk of the invention.
Figure 2:
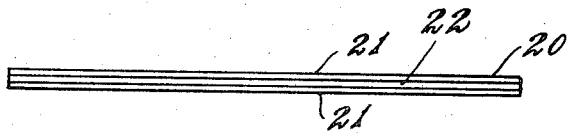
FIG. 2 is a side elevation of the clutch disk of FIG. 1.
Figure 3:
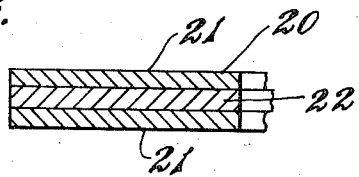
FIG. 3 is an enlarged transverse section of FIG. 1, on the line 3—3.

In oil clutches, particularly those multiple disk clutches used in automatic transmissions, it is desirable that the clutch disk operate always under conditions providing a stable coefficient of friction even when the peripheral velocity, temperature, surface pressure, and other factors are changed. However, with the ordinary oil clutches having their faces made by molding cork, or of powder metallurgy compacts, or other types which have been used in the prior art, the coefficient of friction mu tends to fluctuate considerably as the peripheral velocity V, the temperature T, or the surface pressure P changes. Especially when clutch disks made by molding cork are used, fluctuation of the coefficient of friction is considerable. This causes difficulties among others such as inability to obtain smooth shifting, shock developing during shifting, difficulty in attaining speed. On the other hand, when powder metal compacts or sintered alloys are used, the desired coefficient of friction cannot be obtained unless high surface pressures are applied, and this causes such difficulties as the need to have a large oil pressure mechanism.

The present invention, unlike the prior art clutch disks, provides a wear face which will always maintain a stable coefficient of friction under operating conditions with change of peripheral velocity V, temperature T and surface pressure P. The clutch disk of the present invention incorporates into a porous feltlike sheet, along with organic fibers, activated carbon made from burnt coconut shells which are activated with steam about at 1000° C. and ground to a size through 325 mesh per linear inch, which adheres thereto, desirably using a bonding agent, and attaches the sheet to a core plate of steel or the like or other suitable metal, by impregnating and comolding with resol-type phenolic resin. Other types of core plates may be used such as resin impregnated asbestos and others, as well known in the art.

In the drawings a clutch disk 20 has friction surfaces 21 bonded to a clutch plate 22.

Figure 4:
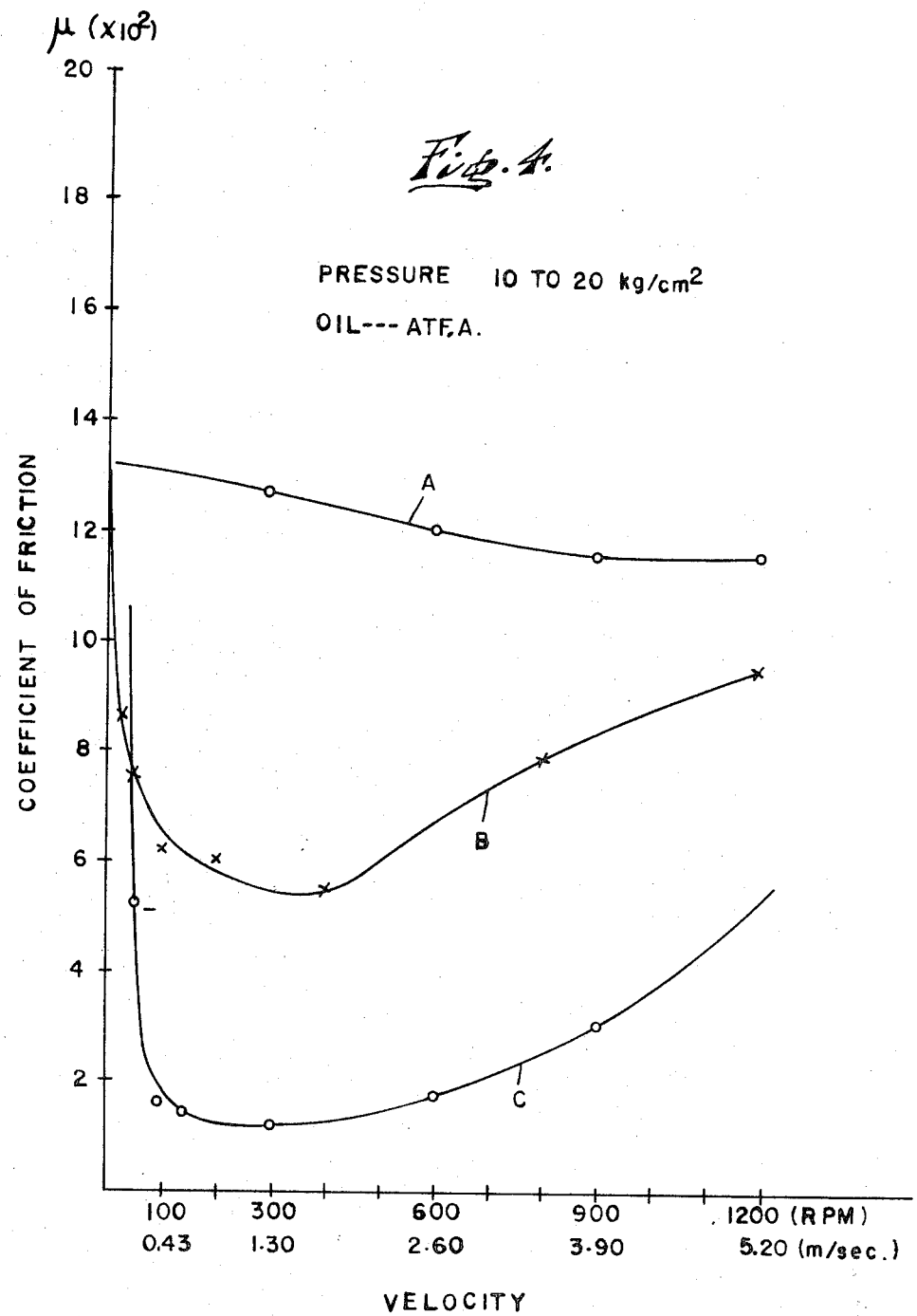
FIGS. 4 through 6 are curves showing the comparison of performance between the clutch disk of the present invention and prior art clutch disks.
Figure 5:
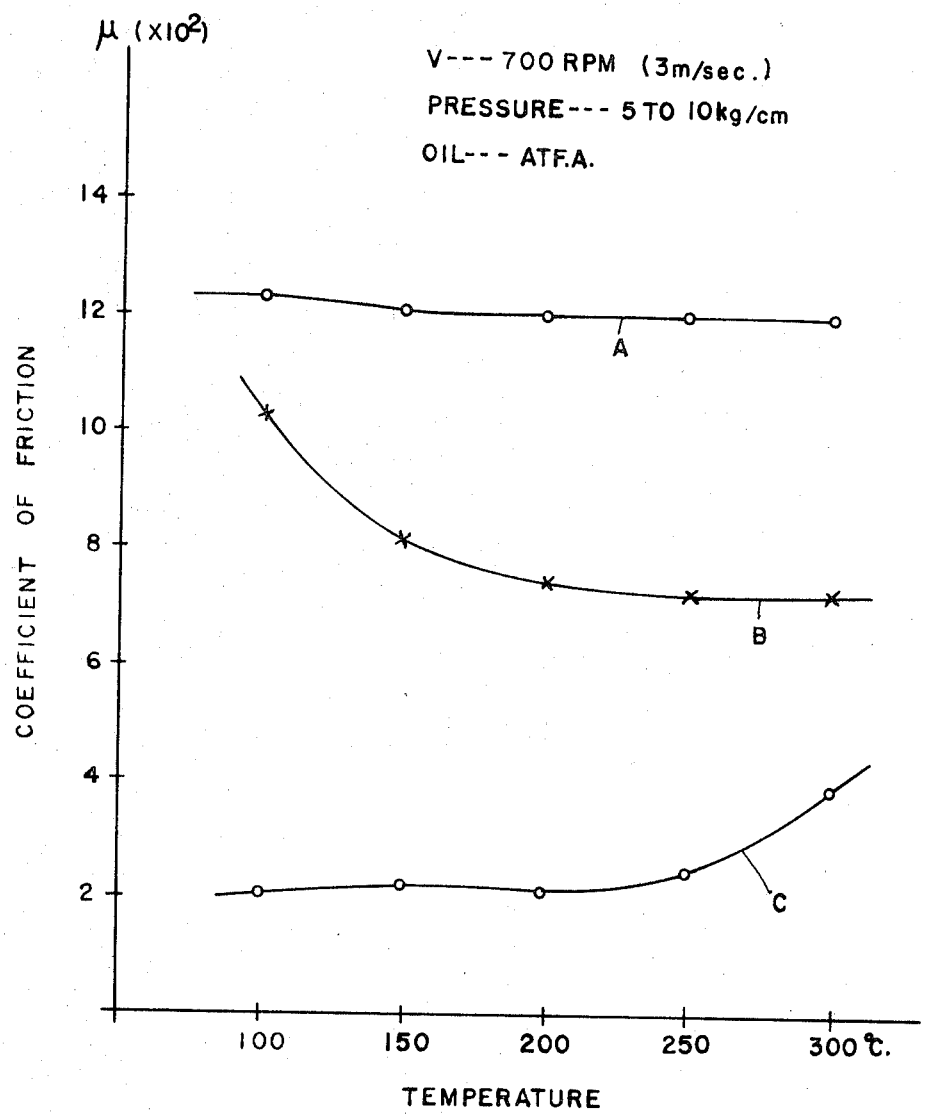
Figure 6:
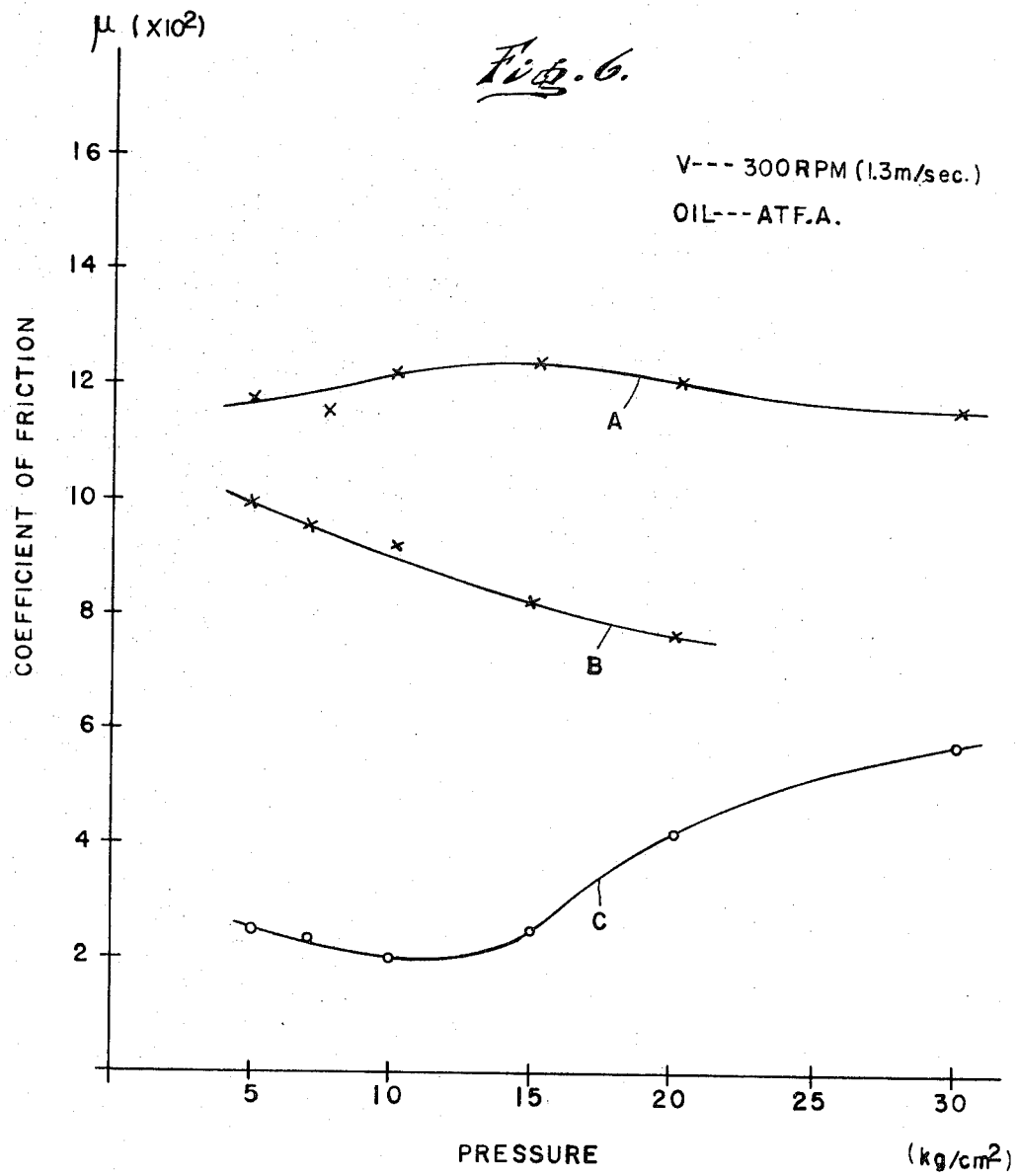

By reference to the curves of FIGS. 4, 5 and 6, it will be seen that in each of these curves the clutch disk of the invention, whose test results are shown in curve A, gives much more constant values of coefficient of friction with variation of velocity, temperature and pressure, than a clutch disk made by molding cork whose test results are shown in curve B, or a clutch disk having a sintered alloy face whose test results are shown in curve C. The coefficient of friction as given in the drawings is the actual coefficient of friction multiplied by $10^{-2}$. Also in the drawings, Aft. A oil is given as an example of the type of oil which might be used, i.e. "Caltex" automatic transmission fluid type A.

The composition and method of making the clutch disk will be described as follows:

A slurry is made of an organic fiber in water. The preferred organic fiber is paper pulp, made of wood, although good results can be obtained by using other organic fibers such as cotton fibers, hemp fibers, or synthetic fibers such as those of rayon, nylon, cellulose acetate, and others.

Coconut shell activated carbon is incorporated into the mixture of slurry by agitation. A small amount of aluminum sulfate in water solution is also added. In order to make sure the particles of finely divided coconut shell activated carbon will disperse and also adhere to the organic fibers, a binding agent such as polyethylene oxide is added. In order to accelerate adhesion, an accelerant such as rosin resin is introduced. The mixture or slurry is then diluted with water to an appropriate concentration for papermaking, and made into a feltlike sheet of fixed thickness and porous in nature by means of a papermaking machine. The sheet is put into a resin impregnation and curing device and is thus impregnated with phenolic resin, and made into the friction material.

Coconut shell activated carbon is superior to other activated carbons for the purposes of the present invention, being harder, having a greater surface area, better durability because the capacity to absorb oil is greater and its lubrication characteristic is superior.

The comparison of the properties of activated carbons made from coconut shells, charcoal and bones is shown below:

|  | Coconut shells | Charcoal | Coal | Bones |
|---|---|---|---|---|
| Quantity of oil absorbed (g./g.) | 1.0 | 1.1–1.2 | 0.75–0.85 | 0.65–0.75 |
| Hardness (Mohs) | 5–6 | 2.5–3.5 | 3.0–4.0 | 3.5–5.0 |
| Surface area (m.²/g.) | 1,300–1,600 | 1,000–1,400 | 400–600 | 200–300 |
| Diameter of pores (angstroms) | 18–20 | 40–50 | 20–25 | 80–100 |

Figure 7:
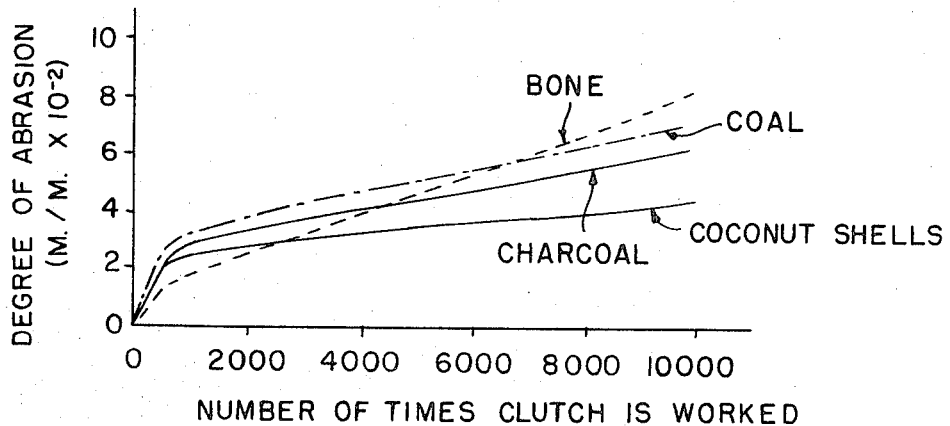
FIG. 7 is a series of curves showing the relationship of clutch facings made according to the invention from activated carbon made from burnt bones, activated carbon made from coal, activated carbon made from charcoal, and activated carbon made from burnt coconut shells, plotting degree of abrasion in m./m.$\times 10^{-2}$ against the number of times the clutch is worked.

FIG. 7 shows curves for degree of abrasion, in mm.×10⁻² as ordinate versus number of times the clutch is worked as abscissa. It will be evident that the clutch facing made according to Example 1 below using activated carbon made from coconut shells gives the lowest abrasion consistently up to 10,000 applications, the next being activated carbon made from charcoal, the next activated carbon made from coal and the highest after 6,000 applications being activated carbon made from bones.

Figure 8:
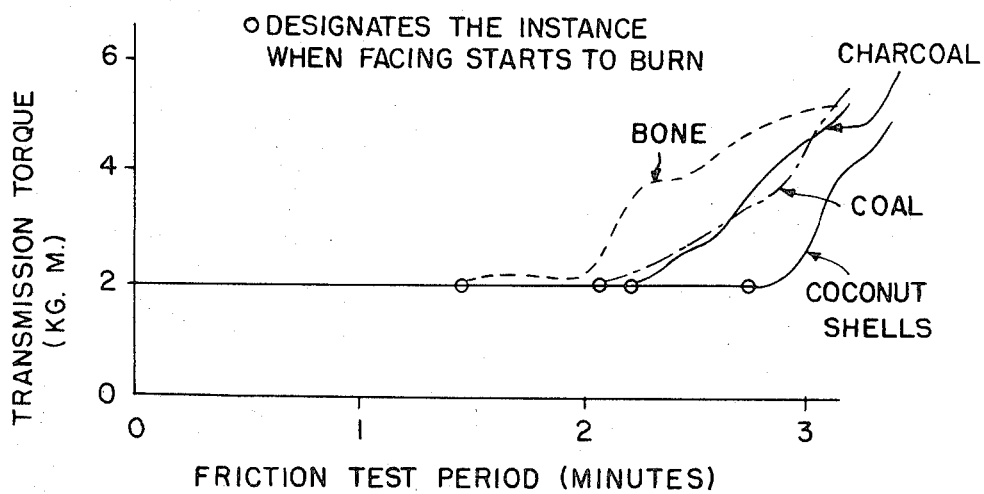
FIG. 8 shows the comparison of clutch facings embodying activated carbon made from burnt bones, activated carbon made from charcoal, activated carbon made from coal and activated carbon made from burnt coconut shells, plotting transmission torque in KG.M against time of the friction test period in minutes and showing the point when the clutch facing starts to burn.

In FIG. 8 we show a comparison of clutch facings according to the procedure of FIG. 1 put into a fixed speed friction testing machine to which no additional lubricating oil was supplied during the test period. The figure plots transmission torque in kg. m. against the friction test period in minutes. The clutch facings having the activated carbon made from coconut shells gave the best results as compared with clutch facings having activated carbon made from coal, made from charcoal and made from bones which showed progressively inferior results.

EXAMPLE 1

Add forty parts by weight of coconut shell activated carbon (all parts hereinafter referred to are parts by weight) to a water tank containing sixty parts of paper pulp in water. Add to the slurry thus formed aluminum sulfate, polyethylene oxide and rosin resin in suitable quantity and introduce the slurry into a papermaking machine, in which a feltlike sheet is produced. Then impregnate the sheet with resol-type phenolic resin equivalent to forty percent the total weight of pulp and coconut shell activated carbon.

EXAMPLE 2

The procedure of Example 1 is carried out except that a small quantity of colloidal silica is added to the slurry before papermaking. A higher coefficient of friction results..

Applying the principles of the invention, friction materials with different coefficients of friction can be obtained by using forty to ninety parts of pulp, sixty to ten parts of coconut shell activated carbon and incorporating phenolic resin equivalent to ten to fifty percent of the total weight of pulp plus activated carbon.

In both examples, it is suggested that 0.02 to 0.05 the weight of pulp plus coconut shell activated carbon of polyethylene oxide, 5 to 10% the weight of pulp plus coconut shell activated carbon of rosin resin and 0.02 to 0.04% of the weight of the pulp plus coconut shell activated carbon of aluminum sulfate be used.

The friction material of the present invention has abundant elasticity because the organic fibers and the coconut shell activated carbon constitute the porous feltlike sheet. When pressure is applied, the sheet is compressed, and when pressure is removed, the sheet regains its original form and thickness. Therefore, when this clutch disk is used as an oil clutch, the voids in the felt sheet become impregnated with oil. When pressure is applied on the surface of the friction plate, the oil in the voids is expelled therefrom.

Moreover, because the coconut shell activated carbon adhering to the organic fibers is extremely porous in nature, oil impregnates the particles of coconut shell activated carbon the same as it impregnates the feltlike sheet, and the quantity of oil impregnated therein increases and decreases as the surface pressure is increased or decreased. Therefore, oil impregnated in the friction material is circulated from time to time as the surface pressure is varied, and thus the oil contributes to maintain a low temperature at the work surface because the oil heated to a high temperature at the work surface is replaced by low temperature oil. Because the working surface of the clutch disk is always maintained at a low temperature due to the circulation of oil, and because coconut shell activated carbon and resol-type phenolic resin are heat resistant and have appropriate hardness and are adhered to the friction material which acts as the working surface, a stable coefficient of friction is always maintained despite the variations in peripheral velocity, temperature or surface pressure.

Because this clutch disk has the characteristic of being always able to maintain a stable coefficient of friction, it is used in oil clutches, particularly in the multiple disk clutches of automatic transmissions, extremely smooth shifting of the clutch can be obtained, and the shock which may accompany variations in speed with other clutch disks can be eliminated by using the clutch disk of the present invention.

In view of our invention and disclosure, variations and modifications to meet individual whim or particular need will doubtless become evident to others skilled in the art to obtain all or part of the benefits of our invention without copying the structure and process shown, and we, therefore, claim all such insofar as they fall within the reasonable spirit and scope of our claims.

Having thus described our invention what we claim as new and desire to secure by Letters Patent is:

1. A clutch disk to be operated in a bath of circulating lubricant having a friction material comprising a porous feltlike sheet of organic fiber, coconut shell activated carbon bonded to the fiber, the coconut shell carbon being ground to a powder through 325 mesh per linear inch before incorporating and being activated by steam at 1000° C. before incorporating, a resol-type phenolic resin impregnating the sheet, and a core plate bonded to the friction material by comolding.

2. A clutch disk of claim 1, in which the friction material includes colloidal silica.

References Cited
UNITED STATES PATENTS

| 3,647,722 | 3/1972 | Albertson et al. | 192—107 M |
| 3,703,224 | 11/1972 | Bray | 192—107 M |
| 3,270,846 | 9/1966 | Arledter et al. | 192—107 M |
| 3,554,860 | 1/1971 | Lacroix | 162—145 |
| 2,819,987 | 1/1958 | Maierson et al. | 117—140 |
| 2,954,853 | 10/1960 | Maierson et al. | 192—107 MX |
| 3,269,889 | 8/1966 | Hutchins | 162—181 X |
| 2,593,146 | 4/1952 | Howard | 252—444 X |

HAROLD ANSHER, Primary Examiner

U.S. Cl. X.R.

156—62.2; 161—159, 162, 168; 162—145, 181 R, 192—107 M